Dec. 4, 1934.  E. A. STALKER  1,982,969
AIRCRAFT
Original Filed Feb. 17, 1933   9 Sheets—Sheet 1
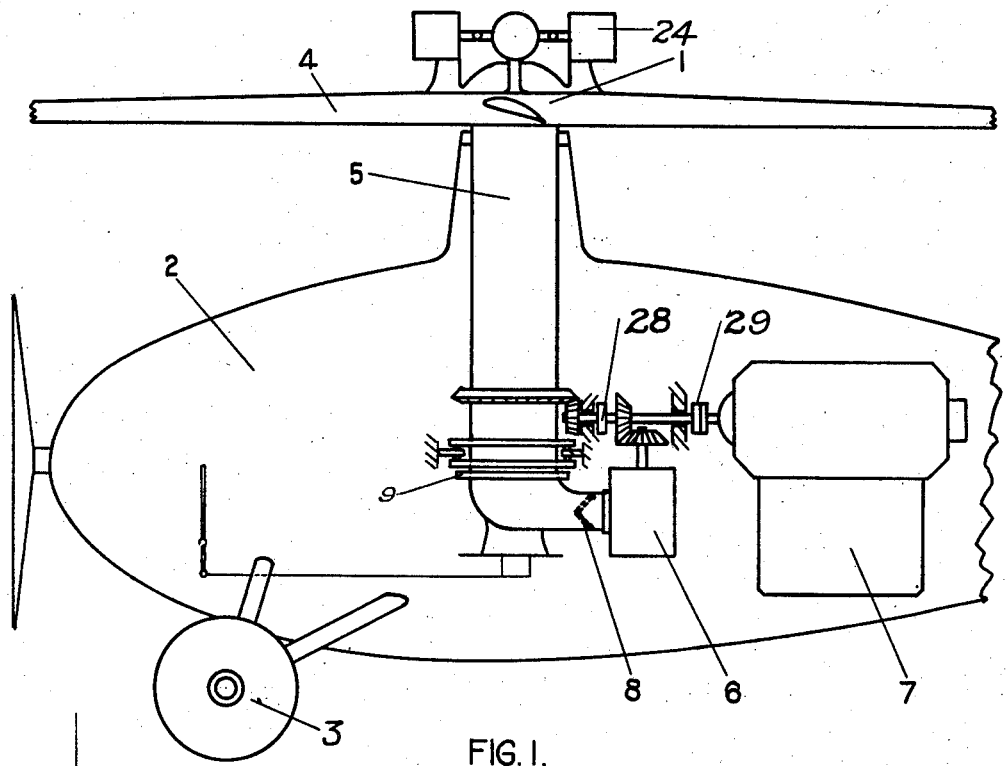
FIG. 1.
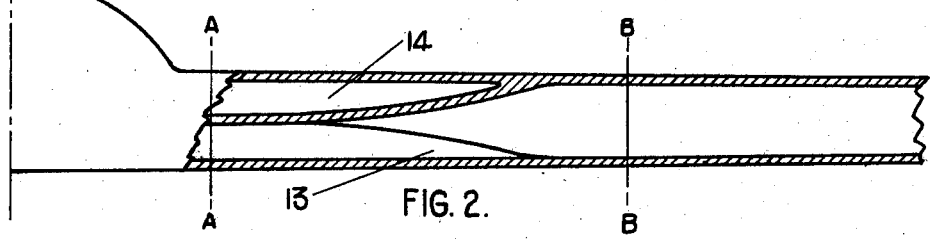
FIG. 2.
A-A  FIG. 3.    B-B  FIG. 4.
INVENTOR
Edward A. Stalker Dec. 4, 1934.  E. A. STALKER  1,982,969
AIRCRAFT
Original Filed Feb. 17, 1933  9 Sheets-Sheet 3

Inventor
Edward A. Stalker
By Maréchal + Noé
Attorney

Dec. 4, 1934.  E. A. STALKER  1,982,969
AIRCRAFT
Original Filed Feb. 17, 1933   9 Sheets-Sheet 4

INVENTOR
Edward A Stalker

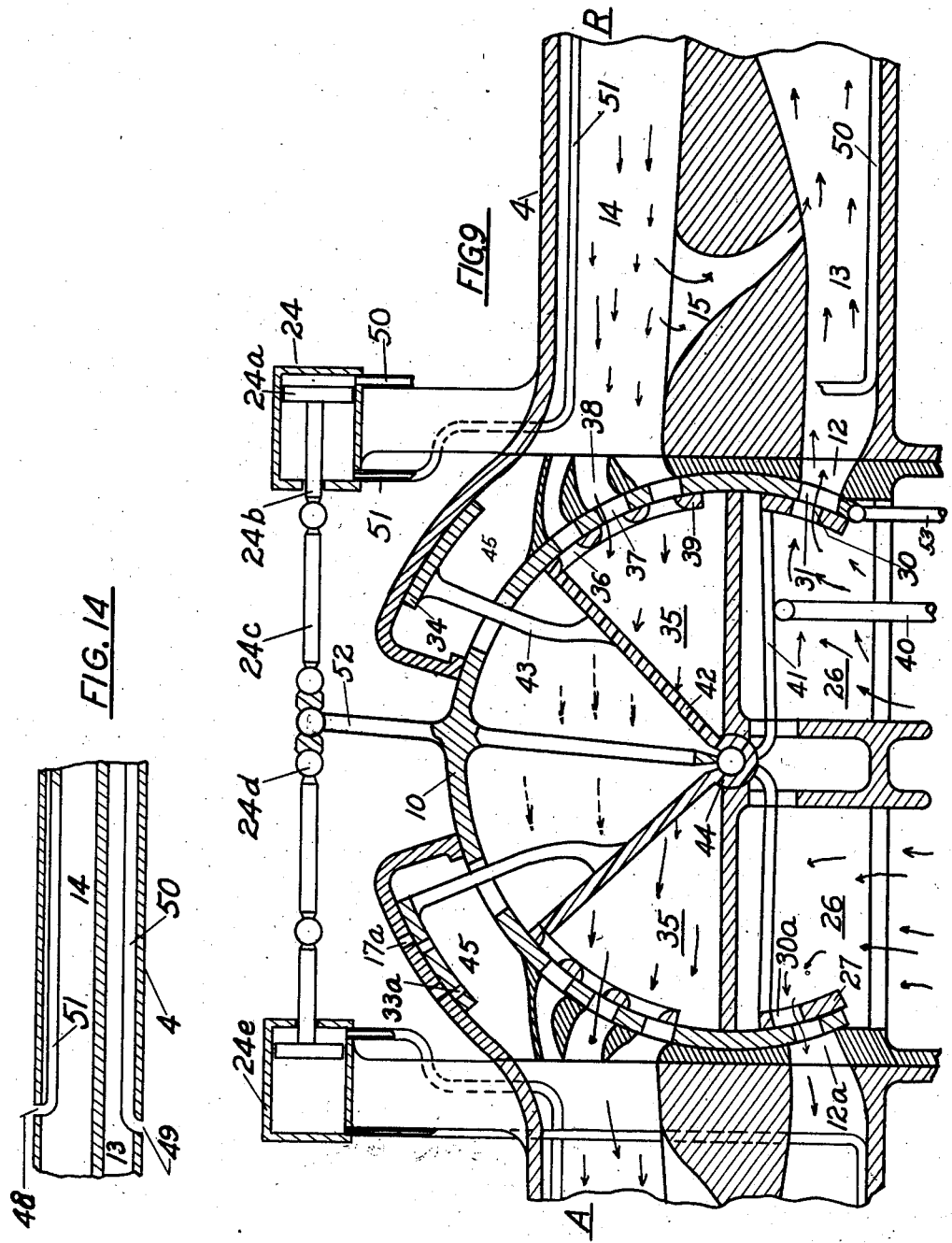

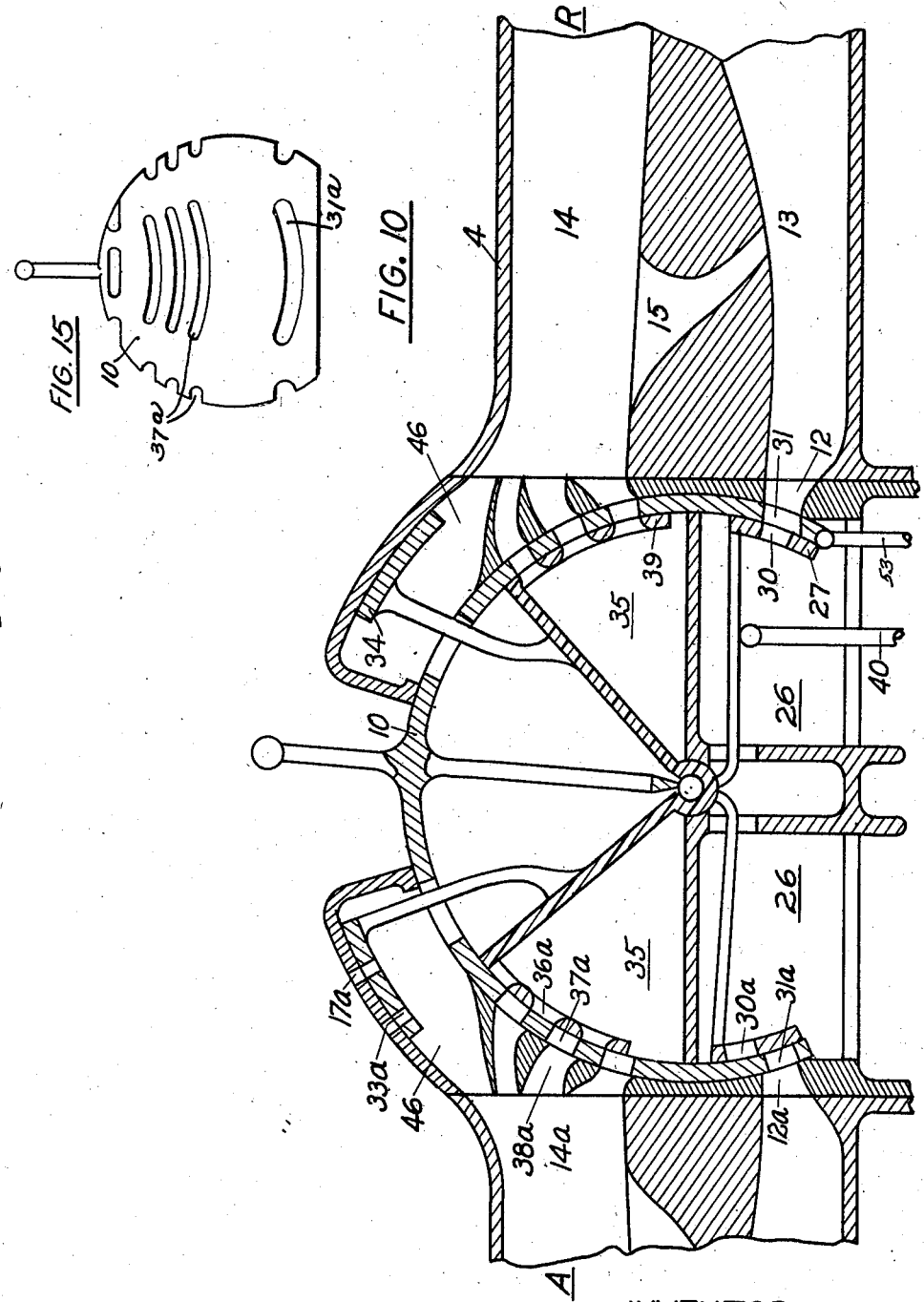

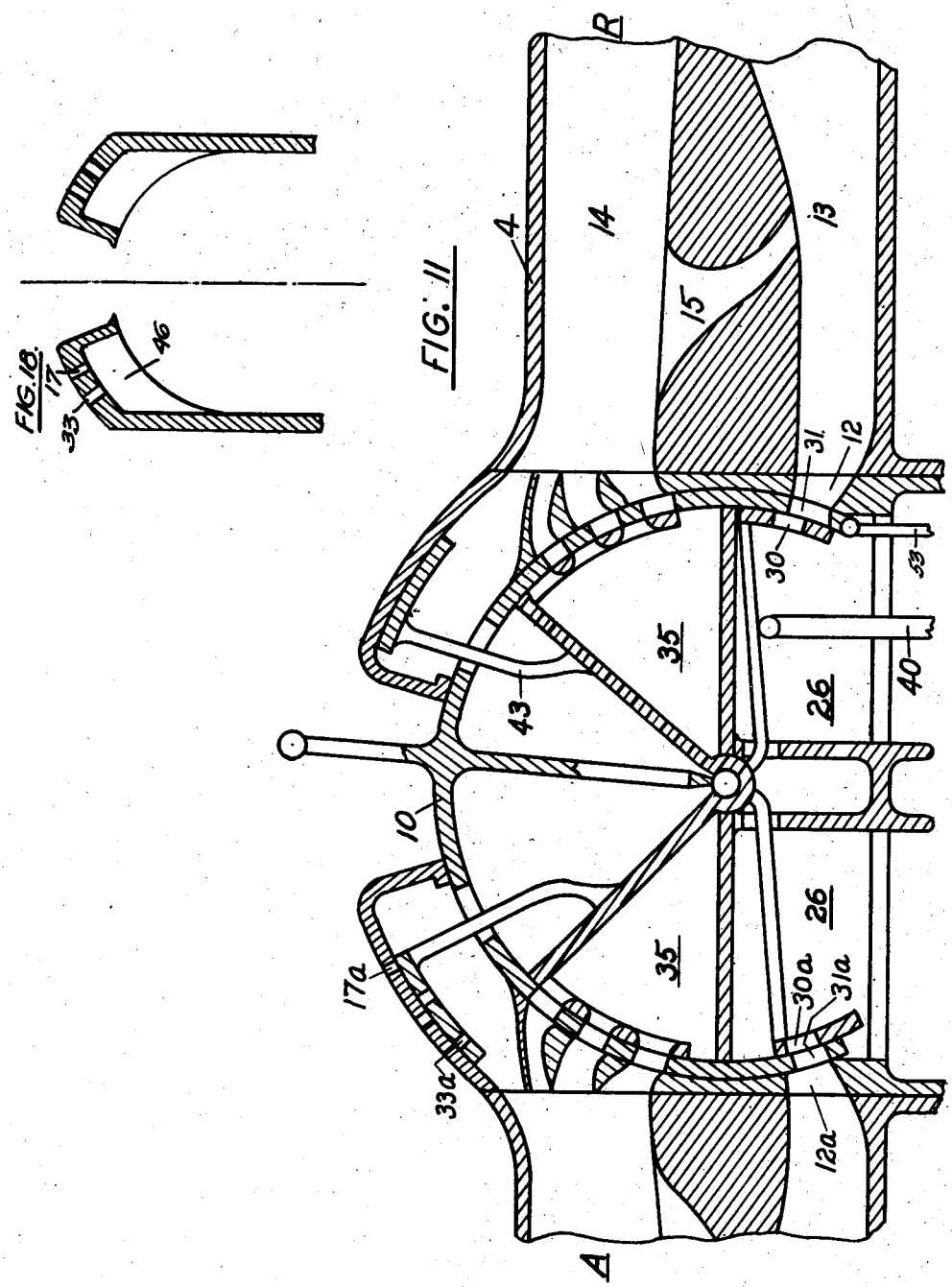

Dec. 4, 1934.  E. A. STALKER  1,982,969
AIRCRAFT
Original Filed Feb. 17, 1933  9 Sheets-Sheet 8
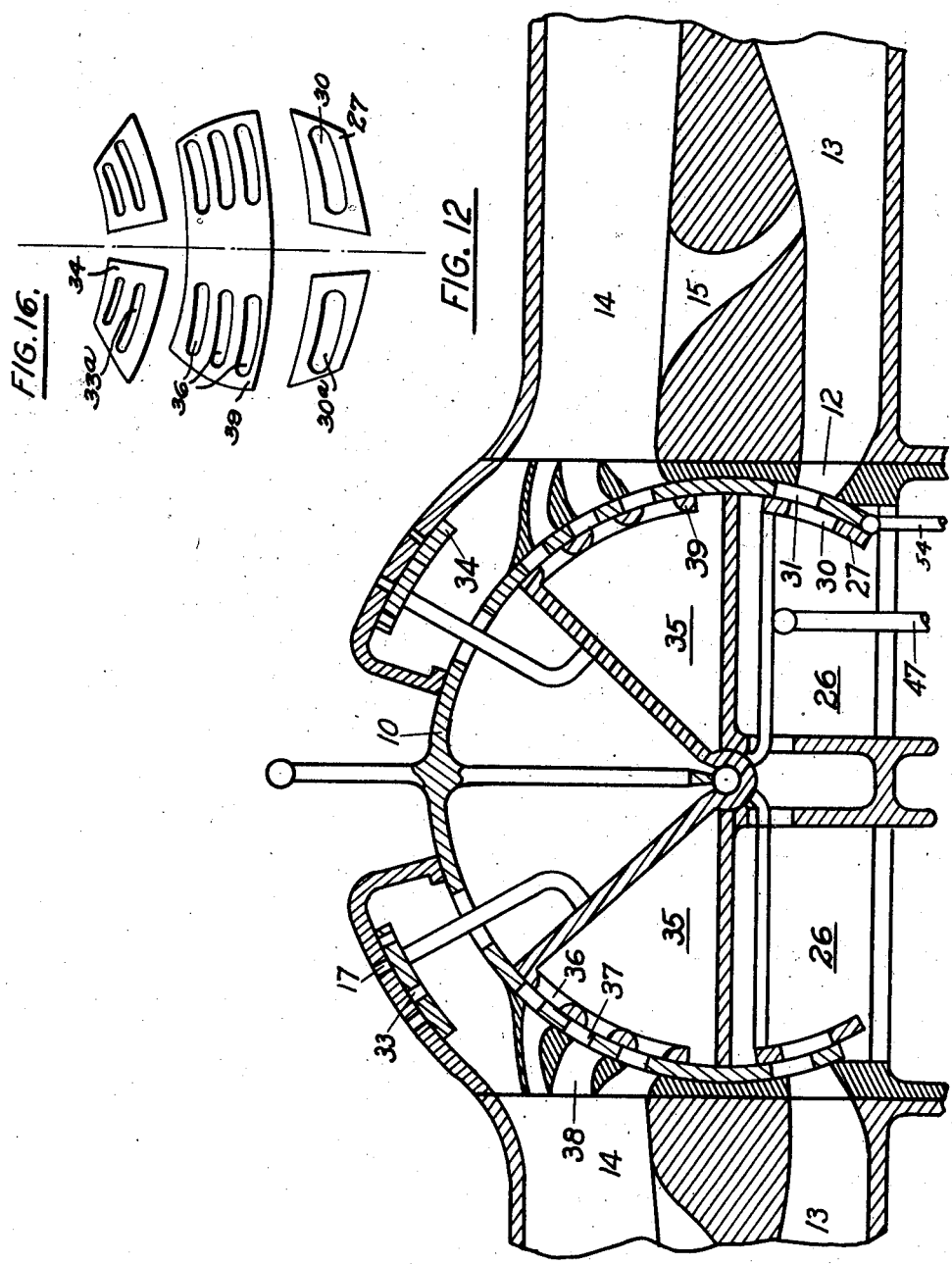
INVENTOR
Edward A. Stalker

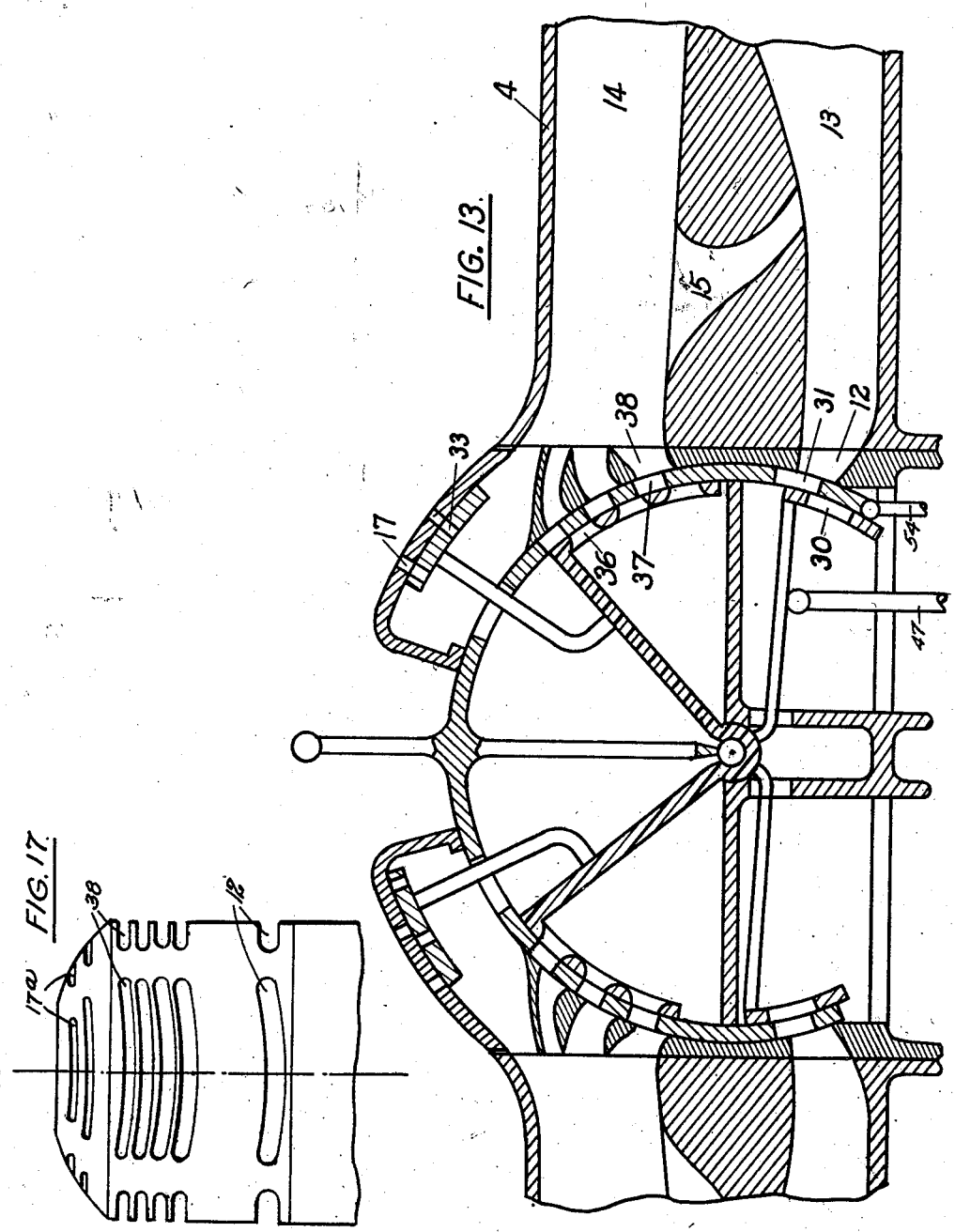

Patented Dec. 4, 1934

1,982,969

UNITED STATES PATENT OFFICE 1,982,969

AIRCRAFT

Edward A. Stalker, Ann Arbor, Mich.

Application February 17, 1933, Serial No. 657,174
Renewed June 11, 1934

24 Claims. (Cl. 244—19)

This invention relates to aircraft and more particularly to aircraft propellers, the present case being a continuation in part of my prior applications Serial No. 506,619 filed January 5, 1931, Serial No. 537,809 filed May 16, 1931, Serial No. 567,393 filed October 7, 1931 and Serial No. 573,650 filed November 7, 1931.

One object of the invention is the provision of an aircraft propeller rotatable about a substantially vertical axis having provision for energizing the boundary layer of air on the propeller blades in a controllable manner to balance the inherent differences in lift between the advancing and retreating blades.

Another object of the invention is the provision of an aircraft propeller having provision for differentially controlling the energization of the boundary layer of air on the blade surfaces including means for producing a regulated flow of air through the various blades.

Another object of the invention is the provision of a lifting propeller for aircraft having manually or automatically controlled means for differentially governing air supplied to blade compartments from which the air flows rearwardly over the blade surfaces, whereby the lift of a blade in any desired position with respect to the aircraft can be governed in order that the aircraft can be maneuvered.

Further objects and advantages of the invention will be apparent from the following description, the appended claims and the accompanying drawings, in which,—

Fig. 1 is a side elevation of a portion of an aircraft embodying the present invention;

Fig. 2 is a vertical section taken through one of the blades of the lifting propeller;

Figs. 3 and 4 are transverse sections taken through the blades on the lines A—A and B—B respectively of Fig. 2;

Fig. 9 is a vertical section taken transversely of the aircraft through the central portion of the lifting propeller;

Fig. 10 is a section corresponding to Fig. 9 but omitting the automatic control pistons and showing the manual control adjusted for relative increase of lift of the retreating blade;

Fig. 11 is a view corresponding to Figs. 9 and 10 but with the manual control adjusted for relative decrease of lift of the retreating blade;

Fig. 12 is a vertical section taken longitudinally of the aircraft through the central portion of the lifting propeller;

Fig. 13 is a view corresponding to Fig. 12, but with the manual control adjusted for increase of lift of the forwardly extending blade;

Fig. 14 is a vertical section through a portion of one of the blades, indicating the tubes from the automatic lift regulator;

Fig. 15 is a detailed view of the automatically controlled spherical valve shell;

Fig. 16 shows in detail separated extended portions of the spherical valve shell;

Fig. 17 is a side elevation of the hub portion with the blades removed;

Fig. 18 is a vertical sectional view taken through the hub; and

Figure 5:
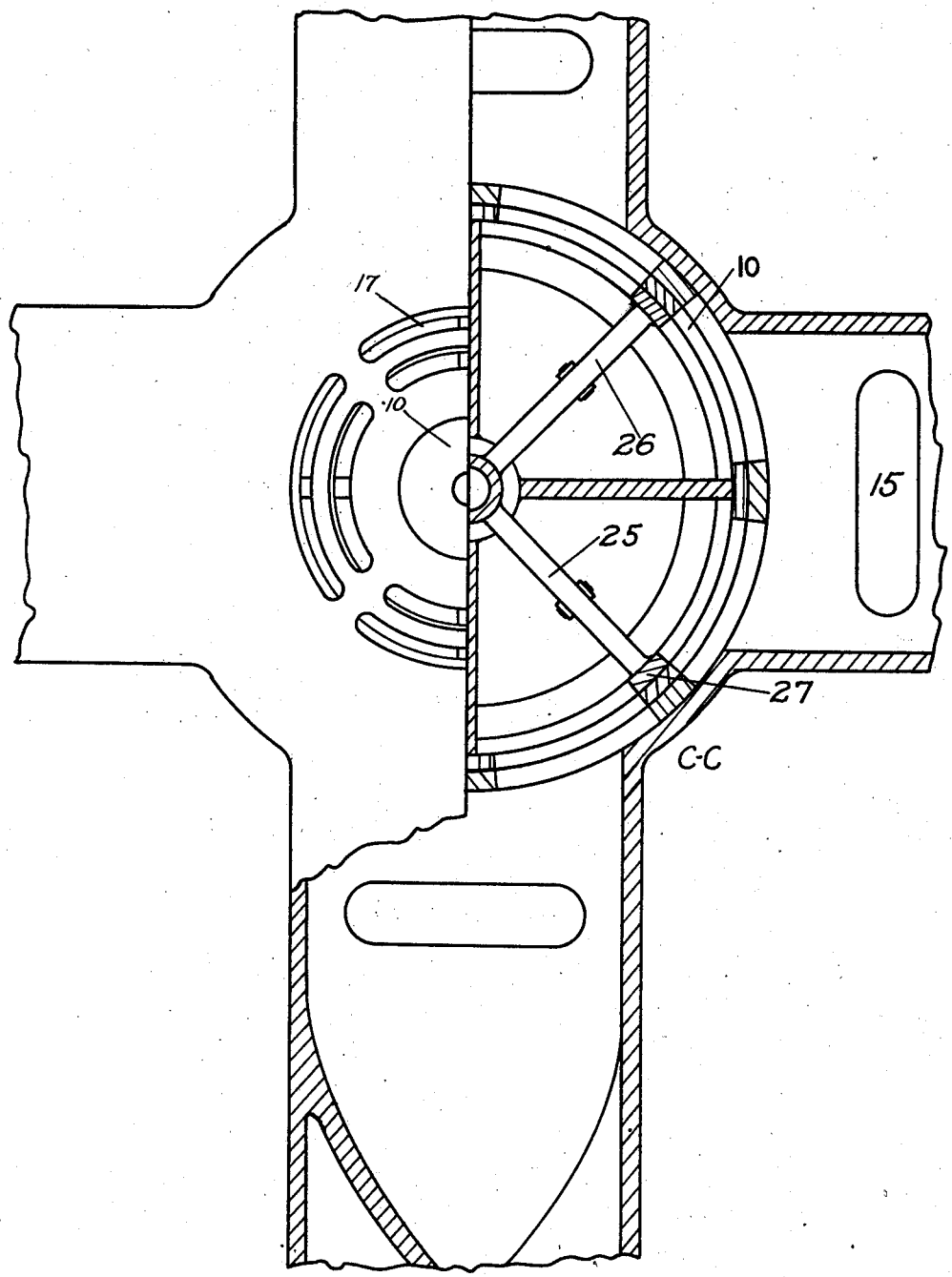
Fig. 5 is a top plan view of the central or hub portion of the lifting propeller, shown partly in section.
Figure 19:
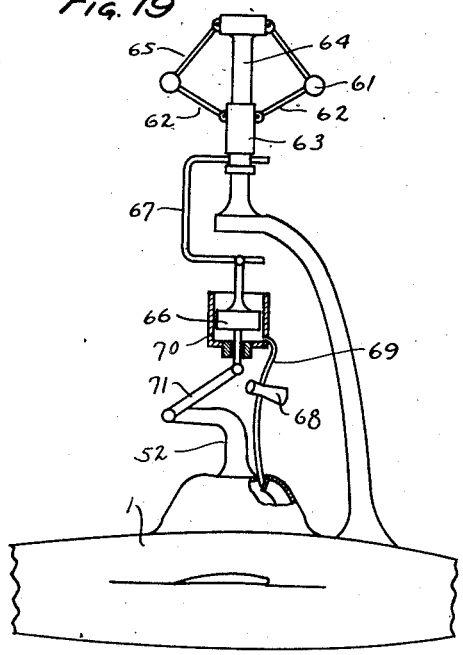
Fig. 19 shows a modified automatic control device.

Referring more particularly to the drawings by reference numerals and first with a special reference to Fig. 1, 2 designates the body of an aircraft having a lifting propeller designated generally by the numeral 1 and rotatable about a substantially vertical axis arranged preferably in line with the center of gravity of the craft and so positioned as to provide, in normal forward flight, a slight upward and forward tilt to the plane of revolution containing the blades. A suitable landing gear 3 is provided for the aircraft body, which also has a tail structure of any desired character. Suitable tractor propelling means are also preferably provided for giving a forward motion to the aircraft, but as the tractor propeller may be of any conventional type well known in the art it has not been herein illustrated in detail, and in fact, may be omitted entirely as the control provided for the various lifting blades may be so operated as to obtain a propulsive as well as a lifting effect.

The lifting propeller 1 is provided with a suitable number of blades 4, which may be pivotally attached to a central hub, although in accordance with the preferred form of the invention, as herein shown, the blades are fixed securely to the hub which is suitably mounted for rotational movement about a fixed axis. The propeller 1 is either driven by power or is rotated by reason of the air effects produced as the aircraft moves forwardly or horizontally, or descends.

In aircraft having auto rotating blades, regardless of whether the blades are fixed to a central hub or are pivotally attached to the hub structure, there is an upsetting movement on the aircraft due to the fact that the retreating blade, that is the blade which is moving in a generally rearward direction as the aircraft moves in a forward direction, has a smaller lifting effect than the advancing blade; and there is thus a substantial difference between the relative instantaneous velocities of the blade with respect to the air on the right and left-hand sides of the aircraft. This unbalance of the blade lifts on opposite sides of the aircraft is productive of an oscillation or rolling tendency, the side of the aircraft on which the blade is retreating tending to assume an attitude lower than the opposite side. Blades of the customary forms of construction are not readily controllable, so that extraneous devices have been utilized for effecting the control of aircraft movements. In accordance with the present invention, however, means are provided for increasing the lift of the blades when they are retreating and thus balancing the upsetting tendencies of the auto rotating or power driven lifting propeller. Moreover the arrangement in accordance with this invention is controllable, and the attitude of the craft and its direction of movement can thus be readily governed. The desired result is effected by control of the removal of the boundary layer of air on the blade surfaces.

The boundary layer of air on the blade surfaces and especially on the upper sides of the blades is created due to the frictional tendencies of the air stream on the blade surfaces, the energy lost being dissipated as heat. The air accumulates on the upper surface of the blades and separates the main air flow from the surfaces themselves, the boundary layer of air becoming turbulent and decreasing the lift of the blade. This boundary layer of air on the upper surface of the blades can be effectively energized with a resultant increase of blade lift by adding energy to the boundary layer either by drawing or sucking the boundary layer of air into the blade (and this is more effectively accomplished at the rear portions of the upper surfaces of the blades), or by accelerating or blowing the boundary layer of air rearwardly along the upper surface, this action being obtained for example by causing rearward blasts of air or other fluid from rearwardly directed openings in the forward portion of the upper blade surface. Either arrangement energizes the boundary layer of air with a resultant increase of blade lift. In energizing the layer of air bounding the blade surface, the air should not be blown outwardly normal to the surface as this does not effectively energize the boundary layer but on the contrary creates a chaotic condition or turbulence in the boundary layer with a resultant destruction of a portion of the blade lift and with a resultant lack of efficiency. If the air blasts are directed rearwardly from the upper blade surfaces, the blasts may be as powerful as desired.

In accordance with the present invention, to which reference will now be made, the boundary layer of air on the blade surfaces is energized both by blowing rearwardly from rearwardly directed slots or openings in the forward portion of the blades, and by sucking inwardly through holes in the blade surfaces at the rear portions of the blades, it being understood that either arrangement may be employed alone.

As shown in Fig. 1, air is furnished to the center of the propeller shaft providing a conduit 5, by means of a blower 6 which may be geared both to the propeller shaft and to the engine 7. The engine is preferably arranged so that it can be readily disconnected from the propeller shaft 5 so that the propeller can rotate freely automatically. A suitable joint 9 permits rotation of the propeller shaft 5 while the lower fixed portion of the conduit remains stationary in connection with the blower 6.

The motor is preferably connected to the pump and to the propeller through an automatic overrunning clutch 29, and a second clutch 28 is also provided for disconnecting the pump from the propeller when desired. The pump 6 has a rotatable impeller which operates about an axis parallel to the propeller axis but spaced therefrom, the pump impeller moving in the opposite direction from the propeller and at a higher speed to counterbalance the propeller reaction torque.

The air that flows up through the hollow propeller shaft to the hub of the lifting propeller is directed through separate longitudinal compartments or passages in the several blades of the propeller 1, the quantity of flow being controlled as will be more particularly described to produce rearwardly directed blasts of air through the rearwardly and upwardly directed passages or slots which lead out from a forward compartment 13 in each blade. The compartments 13 extend longitudinally along the forward or leading portion of each blade, continuing into a lower compartment extension adjacent the hub portion of the blade as shown in Figs. 2 and 3. Each blade is also preferably provided with a rear compartment 14 extended into an upper compartment extension adjacent the hub portion of the blade. The compartment 14 connects with openings which may be arranged normal to the blade surface, through which air can be withdrawn into the blade when the blade is retreating, in order that its lifting effect will be increased under such conditions. The various openings in the blade surface are preferably distributed longitudinally of the blade. The suction which produces the withdrawal of the boundary layer of air from the rear portion of the retreating blade may be produced by the suction effect of the advancing blade, or by the suction on all the remaining blades, which are subjected to greater suction on their rear surfaces than is produced on the corresponding portion of retreating blade.

The withdrawal of air through the openings 16 on the rear portion of a retreating blade and into the compartments 14 may also be effected by an injector action as shown in Fig. 9, the passage 15 providing limited communication between the rear compartment 14 and the forward compartment 13 so that an outward flow in compartment 13 adjacent the exit opening of passage 15 produces a suction effect tending to lower the pressure in the compartment 14.

The control means for governing or proportioning the supply of air to the various blades, as shown in Fig. 9 for example, preferably comprises a shell 10 of spherical form which may be automatically controlled for automatically stabilizing the lifts of the various blades, this shell containing an inner shell 27 which may be manually controlled by a suitable manual device as will be presently explained. The shells 10 and 27 contain cooperating sets of curved slots providing communication between the blade compartments 13 and 14 and the chambers 26 and 35. The blade hub, shown in Fig. 17, is fixed on the aircraft by supporting means (not shown) extending down through the propeller shaft 5. The blades are all secured together and to the shaft 5, which is rotatably mounted in suitable bearings in any suitable manner. The inner end of the forward or lower compartment 13 of the retreating blade R, see Fig. 9, has an opening which is in communication with one of the four passages 12 provided in the blade hub 90 degrees apart. When the shells 10 and 27 are arranged for straight flight slots 30 and 31 provided respectively in the shells 27 and 10 are in partial communication with the passage 12, so that air supplied from the blower and passing up into the chamber 26, common to the several blades, can flow out through the various chambers 13 of the blades. However, when arranged for normal straight flight a larger passage is provided to the retreating blade R than is provided to the advancing blade A, and while the lift of the advancing blade may be increased to some extent by air flow through the ports 12a, 30a and 31a, over what would normally obtain without energization of the boundary layer, this effect is much greater on the retreating blade due to the greater air flow and the greater rearward blast of air over that blade's surface, so that the effect will be a neutralization of the unbalanced effect of the advancing and retreating blades. This action would take place in the absence of any openings 16 in the rear blade portions, but the arrangement as herein set forth is also adapted for increasing relatively the lift of the retreating blade by withdrawing the boundary layer into the rear blade portions, this air passing from the compartment 14 through passages 38 in the fixed blade hub, and through slots 36 and 37 in the shells 27 and 10 respectively into a common central chamber 35, from which the air is withdrawn by reason of the greater suction effects of the blades which happen to be advancing or which are arranged in a longitudinal direction at the time. The front compartment of advancing blade A for example is in limited communication through slot 38a and the slots 36a and 37a provided in the two shell members so that it can withdraw air from the common chamber 35. In the same way the longitudinally extending blades are also adapted to have the same effect, the result being an increase of lift of any blade while it is retreating, obtained independently of the blowing effect produced by the outflow through the passages leading out from compartments 13.

When the suction that obtains over the rear portion of the advancing blade produces a withdrawal of the boundary layer from the rear portion on the retreating blade there is an outflow on the rear portion of the advancing blade which has the effect of decreasing the lift of the advancing blade to some extent, this action also tending to decrease the unbalanced effect of the lifts of the blades on opposite sides of the aircraft.

The lift of the advancing blade may also be further reduced by providing passages 17a in the fixed hub portion, adapted to register with openings 33a provided in a spherically curved control plate 34 fixed to shell 27 by means of arms 43, so that when the manually controlled shell 27 is adjusted clockwise some little distance from its position shown in Fig. 9 the openings 17a and 33a are brought into registration, see Fig. 10, in order that the lift of the advancing blade will be decreased at a time when the passages 36a and 37a from the compartment 35 are closed or partly closed by the valve control. There may be openings 17a and 33a in all of the four portions of the fixed hub and adjustable plates, although preferably none are provided for the blade retreating position. The space inside the upper portion of the hub is divided into four chambers 45 by partitions 46 arranged at 45° to the plane of symmetry of the aircraft. Walls provided in the shell 10 prevent direct communication between the chambers 45 except through the slots 36, 37 and 38. In the adjusted position of the valve shell 27 mentioned, the passage from the air supply chamber 26 to the compartment 13 of the retreating blade is fully opened, while the passage from chamber 26 to the compartment 13 of the advancing blade is entirely closed. Under such conditions there would be a further increase of lift of the retreating blade and a further decrease of lift of the advancing blade and this will operate to raise the side on which the retreating blade is located. In the same way but in an opposite sense the shell 27 can be moved manually to decrease the lifting effect of the retreating blade by cutting off or reducing the supply of air to its compartment 13 and the lift of the advancing blade can be increased by supplying more air through the opened slots 30a and 31a in order that the side of the aircraft on which the advancing blade is found may be raised.

Even if the pump is stationary due to motor failure for example, an effective control of the blade lifts is obtained by reason of the air inlet openings 33a and 17a, and the suction effect of the advancing blade acting to withdraw air into compartment 14 of the retreating blade.

As shown in Figs. 12 and 13, the air supply chamber 26 is in communication through the slots 30 and 31 provided in the front and rear portions of the control shells with the compartments 13 in the blades that at the time are extending longitudinally of the aircraft, the lift of these blades being increased by the supply of air which flows out the rearwardly directed passages found in the leading or forward portions of the blade surfaces. The suction created on the rear portions of the forwardly and rearwardly extending blades is productive of a suction effect on the air in chamber 35 and thus on compartment 14 of the retreating blade, which is subjected to less suction by blade reaction because it is traveling slower. The shell 10 may be tilted in a longitudinal direction as well as in a lateral direction by automatic means which will be presently described, and the manually operable shell 27 is also adapted to be tilted in a longitudinal as well as in a lateral direction, by means under the control of the operator, in order that the lift of either the rear blade or the front blade can be increased or decreased as desired for the production of a downward or upward movement of the aircraft. When the shell 27 is manually controlled to the position as indicated in Fig. 13, the supply of air from the chamber 26 to the compartment 13 of the rear blade is greatly reduced, and at the same time the passages 17 and 33 in the fixed hub and its cooperating plate 34, which are normally closed for normal flight, may be brought into communication so as to destroy a portion of the lift of the rear blade, shown on the right-hand side of Fig. 13, adapting the propeller for a stalling operation. The lift of the opposing blade will be increased by reason of the greater flow of air from the chamber 26 through the wider valve opening which obtains at that time.

Figure 6:
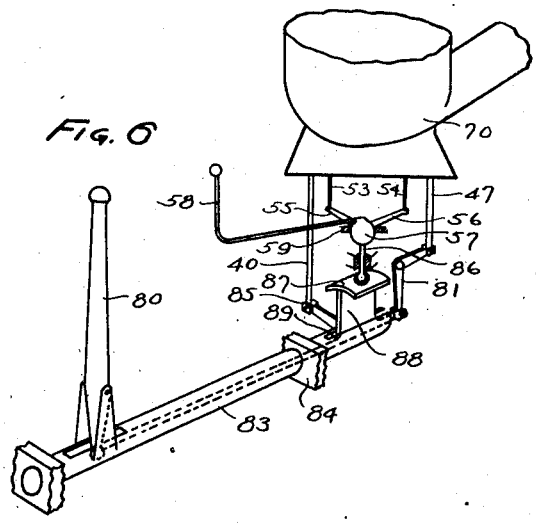
Fig. 6 is a perspective view of the manual control device.
Figure 7:
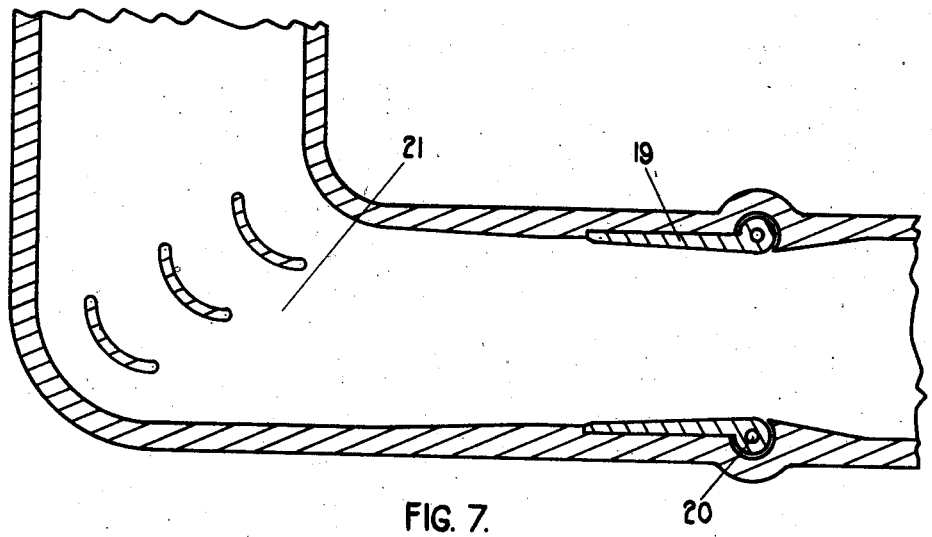
Figs. 7 and 8 are vertical sectional and side elevational views showing the valve in the pump discharge duct.

The manual control for the valve shell 27 is indicated in Fig. 6, being preferably arranged in the form of a stick control tiltable both longitudinally and laterally to effect the control of the longitudinal line of flight and for lateral control respectively. The manual control embodies the stick 80 pivotally connected near its lower end to a longitudinal thrust load which is attached to the downwardly extending end 81 of a bell crank lever the opposite end of which is pivotally connected to the vertical rod 47. The rod 47 extends vertically through a suitable packing connection in the fixed air duct, and is pivotally attached at its upper end as shown in Fig. 12 to the movable shell 27 and adapted to tilt the shell about a transverse line when the stick 80 is moved longitudinally. Longitudinal tilting movement of the shell 27 differentially controls the amount of air supplied to the front and rear blades and thus controls their relative lifting effects.

The stick 80 is tiltable about a longitudinal axis with its supporting tube 83. The latter is rotatably supported in bearing members 87. As the tube 83 is rocked an arm 85, fixed to the tube, is moved so as to operate a rod 40 vertically. The upper end of the rod 40 is pivotally connected as shown in Fig. 11 to the right-hand side of the shell 27, vertical movements of the rod 40 causing the shell to tilt about a longitudinal axis and thus differentially controlling the supply of air to the two laterally extending blades.

Any movement of the stick either in a longitudinal or a lateral direction, from its normal neutral position, frictionally locks the automatic operation of the control shell 10 which may readily be adjusted by manual operation of lever 58 to a normal position if desired. Depending from and pivotally attached to the shell 10 are vertical rods 53 and 54, rod 54 being connected to the rear of the shell while rod 53 is connected to the right-hand side of the shell as shown in Figs. 13 and 11. These rods extend down through packed openings in the stationary air duct portion, and are pivotally connected to arms 55 and 56 rigid with a ball member 57. A third arm 58 also projects from the ball member and is adapted to be manually operated if desired. The ball member 57 is normally movable freely below a fixed seat 59 during automatic operation of the shell 10. However, when the manual control is moved out of a normal position, the ball member 57 is forced up against the seat 59 and held frictionally against it so as to maintain a position of the shell 10. This action is accomplished by a rod 86 the lower rounded end of which normally rests in a depression in a plate 87 when the stick is in a normal upright position. This plate 87, which is laterally convex upwardly, is carried rigidly on an upstanding wall 88 fixed to the endwise movable longitudinal rod and movable in a slot 89 in the tube 83. The wall 88 thus tilts laterally when the shell 83 is tilted laterally, and also moves longitudinally when the rod 80 is tilted in a longitudinal direction. As soon as the wall 88 is moved from a normal position, the lower rounded end of the rod 86 is moved upwardly out of the depression in the plate 87, and thus presses the ball 57 against the seat 59 so as to hold the shell 10 against operating.

The stick 80 normally remains in an upright position so that the shell 10 is free to be controlled automatically. The automatic balancing mechanism which maintains a normal attitude for the aircraft, preferably comprises four piston and cylinder assemblies, one provided at the inner end of each of the blades. As shown in Fig. 9, the retreating blade, at its inner end, carries a support on which is mounted a cylinder 24 containing a movable piston 24a. The rod 24b which extends from the piston is connected to a post 52 which projects up from the center of the shell 10. The post 52 is also connected to an opposite piston arranged in a cylinder 24e provided on the advancing blade. From the inner side of each cylinder extends a tube 51 which passes out through the blade to a hole 48 provided in the blade's upper surface. A hole 49 in the lower surface of the blade is in communication with the outer end of a tube 50 which extends through the blade and up to the outer side of the cylinder 24. Consider the retreating blade R shown at the right of Fig. 9. If this blade has less lifting effect than the advancing blade, as it would if the boundary layer of air on the two blades were not energized, the suction created on the upper surface of the retreating blade and effective on the inner side of the piston 24a would be less than the suction on the inner side of the opposing piston, and the two pistons would strike a balance as shown in Fig. 12, holding the post 52 toward the retreating blade and thus giving more air to the compartment 13 of the retreating blade in order to equalize the lifting effects of the retreating and advancing blades. Fig. 14, therefore, shows the normal position for the shell 10. However, if the attitude of the aircraft is temporarily changed, or if the blade lifts are affected by extraneous wind currents or speed changes productive of variations of the relative lifts of the advancing or retreating blades the device is automatically effective to control the position of the post 52 and thus of the shell 10 to maintain a normal balance of the lifts of the blades. A normal position of the aircraft is thus maintained automatically.

Similar piston and cylinder automatic devices are provided on all of the blades, as shown in Fig. 1, and thus the position of the shell 10 is automatically controlled longitudinally (about a transverse axis) so that any diving or stalling tendencies of the craft are automatically stabilized. Fig. 13 shows the normal position of the shell 10 with respect to longitudinal tilting movements, the air supply being divided equally to the advancing and retreating blades under normal conditions if the manually controlled shell 27 is in a normal position. If there is some dissymmetry of lift in the forwardly and rearwardly extending blades such as might be due to parts of the aircraft interfering with the air flow, the automatic operation of the shell 10 will equalize this dissymmetry.

Figure 8:
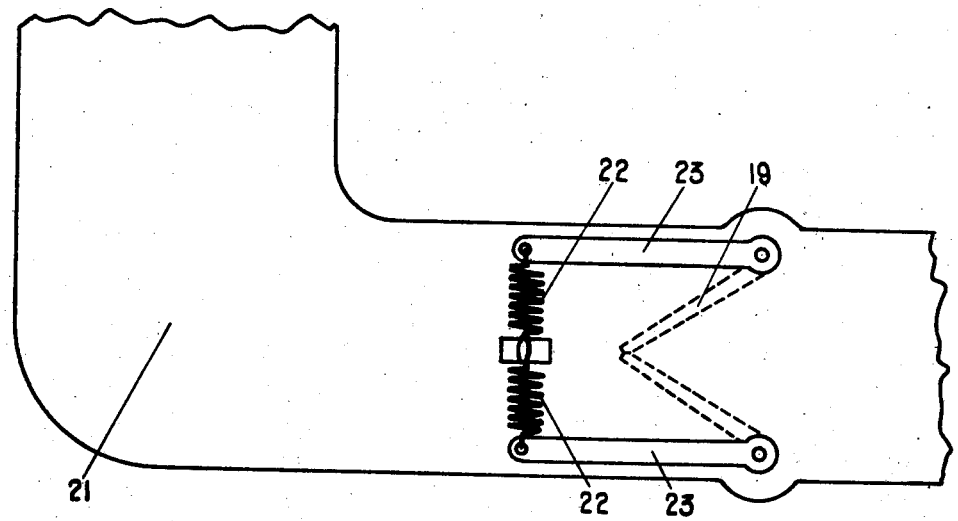

It will be obvious that the automatic control herein provided may be omitted and reliance placed merely upon the manual control for governing the differential supply of air to the various blade compartments, and also that the manual control can be entirely omitted and the supply of air governed only automatically. By variation of the lift of the blades as herein set forth, the desired result is obtained in a strong structure, especially if the blades are fixed securely to the hub, and the lateral and longitudinal control of the aircraft's position is very effective as long as the lifting propeller is rotating. This is quite the contrary to the usual aileron arrangement which loses practically all of its effectiveness at very slow speeds of forward movement of the aircraft. As shown in Figs. 17 and 8 valve plates 19 may be provided between the pump and the propeller shaft, adapted to be closed by springs 22 operating through arms 33 when the pump stops so that air will not be drawn into the chamber 26 under such conditions. Normally the air pressure created by the pump holds the valve plates open permitting air to flow through the passage 21 and through the propeller shaft.

Fig. 11 shows a modified form of automatic lateral control. The post 52 which extends upwardly from the shell 25, in this modified arrangement, is connected by a laterally extending link 71 to a piston 66 which operates in a stationary cylinder 70 suitably supported from a fixed portion of the hub. The piston 66 is also operably connected to an arm 67 which is movable vertically in accordance with the speed of rotation of the lifting propeller. This vertical movement is obtained through a sleeve 63 connected by links 62 to weights 61 which rotate about the axis of the lifting propeller, being carried on an arm reaching up from one of the blades. The lower side of the piston is subjected to suction through a tube 69 leading to a forwardly directed Venturi device 68. The amount of unbalance of the aircraft produced by differences of lift of the advancing and retreating blades is dependent on the forward speed of the aircraft and the rate of blade rotation. The inertia of a rotating element is used for modifying the movement given the post 52 by variation of the Venturi suction effect, the forces being coordinated with the air speed by reason of the suction created in the venturi 68 and applied to the lower side of the piston, and also coordinated with the speed of rotation. The combined forces govern the position of the post 52 and thus govern the position of the shell 10 automatically. As the speed of rotation increases, the post 52 is pulled laterally and vice versa, and as the speed of forward movement increases a contrary effect is produced.

In present practice flapping blades pivotally connected to the blade hub and rotatable about a substantially vertical axis are allowed to rotate at their highest tip speed which, however, is always limited by the high stresses due to centrifugal force. The maximum ratio of forward speed to tip speed, however, in present practice is limited by the amplitude of flapping permissible without striking other parts of the aircraft such as the tractive propeller or rudder. Another limiting factor on the speed of rotation is the effect of the air at the velocity of sound. Therefore if high speeds are to be obtained with safety, the amplitude of flapping must be reduced, and the proper control of the boundary layer energization in accordance with this invention will of course reduce such flapping tendencies and unbalance effects. With the proper control of the air supplied to the blades for properly balancing the lifting effects of the various blades the amount of flapping or flapping tendencies will be rendered negligible, yet the device may be readily controlled to produce ample force movements to obtain a desired change in direction or to obtain desired lateral rolling movements.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In an aircraft, lifting blades rotatable about a substantially vertical axis, and each subjected to different suction effects on its upper surface at different points in each rotation, said blades having internal compartments and having openings in their upper surfaces leading to said compartments, and control means providing for and governing the passage of air from a compartment of one blade to a compartment of another blade for increase of lifting effect of a blade by energization of its boundary layer of air at a predetermined point in each rotation.

2. In an aircraft, lifting blades rotatable about a substantially vertical axis and each subjected to different suction effects on its upper surface at different points in each rotation, said blades having internal compartments and having openings in their upper surfaces leading to said compartments, and means providing for and governing the passage of air from the compartment of one blade to the compartment of another blade to energize the boundary layer of air on the retreating blade and relatively increase its lifting effect.

3. In an aircraft, lifting blades rotatable about a substantially vertical axis, said blades each having a longitudinal rear compartment with an opening in the rear portion of the upper blade surface in communication with said compartment, controllable means placing the rear compartment of one blade in communication with the rear compartment of another blade, and means for controlling said controllable means for relatively increasing the lifting effect of the blades at a determined point in each rotation.

4. In an aircraft, lifting blades rotatable about a substantially vertical axis and each subjected to different suction effects on its upper surface at different points in each rotation, said blades each having a longitudinal front compartment and a longitudinal rear compartment with front and rear openings in the upper blade surfaces in communication respectively with said front and rear compartments, a pump, and controllable means placing the rear compartment of one blade in communication with the rear compartment of another blade and placing the front compartments of the blades in communication with said pump for variation of the lifting effect of a blade at a determined point in each rotation.

5. In an aircraft, lifting blades rotatable about a substantially vertical axis, said blades each having a longitudinally extending compartment with a rearwardly directed opening in the upper blade surfaces in communication with said compartment arranged for directing a rearward blast of air from the upper surface of the blade, means for supplying air to said blades for discharge through said openings to energize the boundary layer of air on the blade surfaces and increase the lifting effect of the blades, and control means for governing the air flow to the blades for the supply of a greater amount of air to a blade when in a predetermined position in its rotational movement.

6. In an aircraft, lifting blades rotatable about a substantially vertical axis, said blades each having a longitudinally extending compartment with a rearwardly directed opening in the upper blade surfaces in communication with said compartment arranged for directing a rearward blast of air from the upper surface of the blade, means for supplying air to said blades for discharge through said openings to energize the boundary layer of air on the blade surfaces and increase the lifting effect of the blades, and means for governing the air flow to the blades for supplying greater amounts to the blades when retreating than at other positions.

7. In an aircraft, lifting blades rotatable about a substantially vertical axis, said blades each having a longitudinally extending compartment with a rearwardly directed opening in the upper blade surfaces in communication with said compartment arranged for directing a rearward blast of air from the upper surface of the blade, means for supplying air to said blades for discharge through said openings to energize the boundary layer of air on the blade surfaces and increase the lifting effect of the blades, and manually controllable valve means for differentially controlling the amounts of air supplied to different blades in accordance with their positions with respect to the aircraft.

8. In an aircraft, lifting blades rotatable about a substantially vertical axis and each subjected to different suction effects on its upper surface at different points in each rotation, said blades having internal compartments and having openings in their upper surfaces leading to said compartments, means for supplying air to said compartments for discharge through said openings to energize the boundary layer of air on the blade surfaces, and manually controllable valve means for controlling the amounts of air supplied to the different blades in accordance with their positions with respect to the aircraft.

9. In an aircraft, lifting blades rotatable about a substantially vertical axis, said blades having internal compartments and openings in their upper surfaces leading into said compartments, pumping means, a conduit from said pumping means to said compartments, and means for differentially controlling the flow between the pumping means and the various blade compartments.

10. In an aircraft, lifting blades rotatable about a substantially vertical axis, said blades having internal compartments and rearwardly directed openings in their upper surfaces leading into said compartments, pumping means, a conduit from said pumping means to said compartments, and means for differentially controlling the flow between the pumping means and the various blade compartments in accordance with the positions of the blades with respect to the aircraft.

11. In an aircraft, lifting blades rotatable about a substantially vertical axis, said blades having internal compartments and openings in their upper surfaces leading into said compartments, pumping means, a conduit supplying fluid from said pumping means to said compartments, means controllable to distribute the fluid differentially to said compartments and arranged for normally supplying more fluid to the blade which is retreating for the energization of its boundary layer and increase of its lifting effect.

12. In an aircraft, lifting blades rotatable about a substantially vertical axis, said blades having internal compartments and openings in their upper surfaces leading into said compartments, pumping means, a conduit supplying fluid from said pumping means to said compartments, means controllable to distribute the fluid differentially to said compartments and arranged for normally supplying more fluid to the blade which is retreating for the energization of its boundary layer and increase of its lifting effect, and means for manually controlling said controllable means.

13. In an aircraft, lifting blades rotatable about a substantially vertical axis, said blades having internal compartments and openings in their upper surfaces leading into said compartments, pumping means, a conduit supplying fluid from said pumping means to said compartments, means controllable to distribute the fluid differentially to said compartments and arranged for normally supplying more fluid to the blade which is retreating for the energization of its boundary layer and increase of its lifting effect, and means for automatically controlling said controllable means in accordance with pressure changes on the blades.

14. In an aircraft, a lifting propeller comprising a hub portion rotatably mounted on a fixed substantially vertical axis of the aircraft and blades fixed on said hub portion and each subjected to different suction effects on its upper surface at different points in each rotation, said blades having internal conduits and air passages in their upper surfaces in communication with said compartments, means for supplying air to said compartments, and means for differentially controlling the supply of air to the various blades.

15. In an aircraft, a lifting propeller comprising a hub portion rotatably mounted on a fixed substantially vertical axis of the aircraft and blades fixed on said hub portion and each subjected to different suction effects on its upper surface at different points in each rotation, said blades having internal conduits and air passages in their upper surfaces in communication with said compartments, a prime mover for said lifting propeller, a blower operated by said prime mover, means for supplying air from said blower to said compartments, and means for differentially controlling the supply of air to the various compartments.

16. In an aircraft, lifting blades rotatable about a substantially vertical axis, said blades having compartments and openings in their upper surfaces in communication with said compartments arranged for air flow therethrough for the energization of the boundary layer of air on the blades, valve means provided at the inner ends of the blades for controlling the flow of air through said compartments and openings, and means for controlling said valve means for variation of the flow for the various blades to relatively increase the lift of the blade at a determined position on the aircraft.

17. In an aircraft, lifting blades rotatable about a substantially vertical axis, means providing a flow of fluid through said blades for energizing the boundary layer of air, a hub to which said blades are fixed, a plurality of nested valve shells in said hub having openings controlling the flow of fluid through the blades, means for automatically operating one of said shells in accordance with variations of pressure to equalize the lifting effect of the blades, and means for manually controlling the other of said shells.

18. In an aircraft, lifting blades rotatable about a substantially vertical axis and having openings in their upper surfaces, a prime mover for rotating said blades, a rotatable pump operably connected to said blades and rotatable in an opposite direction from said blades on an axis parallel thereto but spaced therefrom and arranged for counteracting the rotational torque on the blades, and means connecting said pump to the interior of the blades for producing a flow through the blade openings.

19. In an aircraft, a lifting screw rotatable about a substantially upright axis and having blades provided with openings in the blade surface for energizing the boundary layer, valve means for increasing the flow of air through the openings of one blade while decreasing the flow of air through the openings of an opposed blade, and pressure sensitive means for automatically regulating said valve means to differentially control the lift movements of opposite blades.

20. In an aircraft, a supporting rotatable airscrew having opposed blades provided with openings in the blade surface, each blade being formed with a compartment having communication with the openings of the blade, a shell bounding said compartment in part, a second shell, means to alter the pressure in the shells, said shells having registering openings adapted to open communication between the compartment of one blade and the shell interior while closing communication between the compartment of an opposite blade and the shell interior, and means to regulate the relative positions of said shells.

21. In an aircraft, a lifting screw rotatable about a substantially upright axis having blades each provided with openings for energizing the boundary layer and provided with a compartment in communication with said openings, flow inducing means for said blades, a common flow distributor for said blades controlling the flow through the compartments of the different blades, means supporting said distributor for pivotal movement about a plurality of axes, and means for operating said distributor about one axis to control flow through compartments of laterally opposed blades and for operating said distributor about another axis to control flow through compartments of longitudinally opposed blades.

22. In an aircraft, a lifting screw rotatable about a substantially upright axis having blades each provided with openings for energizing the boundary layer and each having a compartment in communication with the openings of the blade, flow inducing means for said blades, a flow distributor for said blades controlling the flow through the compartments of the different blades, means for supporting said distributor for movement in a plurality of directions, said distributor being operable in one direction for controlling the flow through laterally opposed blades and being operable in another direction for controlling the flow through longitudinally opposed blades, and a pilot's control stick connected to said distributor and controlling said distributor in both said directions.

23. In an aircraft, an airscrew designed for translation substantially parallel to its plane of rotation comprising a hub member, blades attached thereto, passages in the blades communicating with openings in the surfaces of the blades to energize the boundary layer, and means for controlling communication between the passages of different blades to produce an increase of lift of the retreating blade and oppose the upsetting moments on the airscrew.

24. In an aircraft, a supporting rotatable airscrew having blades provided with openings in their upper surfaces, and having passages communicating with the openings and means to control communication between said passages to alter the boundary layer on the blades and consequently reduce the lift of some blades and increase the lift of others, thereby to establish a balance of moments on the airscrew.

EDWARD A. STALKER.